United States Patent [19]

Cossette et al.

[11] Patent Number: 5,267,737

[45] Date of Patent: Dec. 7, 1993

[54] MAGNETIC FLUID SEAL CONTAINMENT SHIELD

[75] Inventors: Luke A. Cossette, Rochester; Craig A. Delagardelle, Oronoco, both of Minn.

[73] Assignee: International Business Machines, Corp., Armonk, N.Y.

[21] Appl. No.: 822,006

[22] Filed: Jan. 16, 1992

[51] Int. Cl.⁵ .................................... F16J 15/40
[52] U.S. Cl. ................................ 277/80; 277/37; 277/44
[58] Field of Search .............. 277/80, 35, 37, 44

[56] References Cited

U.S. PATENT DOCUMENTS

| | | | |
|---|---|---|---|
| 4,252,353 | 2/1981 | Raj et al. | 277/80 |
| 4,309,040 | 1/1982 | Pierrat | 277/80 |
| 4,357,022 | 11/1982 | Raj | 277/1 |
| 4,526,381 | 7/1985 | Ezekiel | 277/80 |
| 4,701,653 | 10/1987 | Merkle et al. | 310/152 |
| 4,779,165 | 10/1988 | Elsaesser et al. | 360/97 |
| 4,817,964 | 4/1989 | Black, Jr. | 277/80 X |
| 4,890,850 | 1/1990 | Raj et al. | 277/80 |
| 4,907,897 | 3/1990 | Shirotori | 384/446 |
| 4,989,885 | 2/1991 | Iwata et al. | 277/80 |
| 5,009,436 | 4/1991 | Endo et al. | 277/80 |
| 5,011,165 | 4/1991 | Cap | 277/80 |
| 5,050,891 | 9/1991 | Ishikawa | 277/80 |
| 5,057,952 | 10/1991 | Takahashi | 277/80 |
| 5,152,539 | 10/1992 | Takii et al. | 277/80 |

FOREIGN PATENT DOCUMENTS

| | | | |
|---|---|---|---|
| 0357105 | 3/1990 | European Pat. Off. | 277/80 |
| 0135269 | 10/1980 | Japan | 277/80 |
| 0012167 | 1/1982 | Japan | 277/80 |
| 0046374 | 2/1990 | Japan | 277/80 |
| 1314166 | 5/1987 | U.S.S.R. | 277/80 |
| 2207202 | 1/1989 | United Kingdom | 277/80 |

*Primary Examiner*—William A. Cuchlinski, Jr.
*Assistant Examiner*—James K. Folker
*Attorney, Agent, or Firm*—Laurence R. Letson

[57] ABSTRACT

A magnetic seal for a disk drive data storage unit is described where the magnet assembly comprising an annular magnet and two annular pole pieces are adhesively attached with the magnet intermediate the pole pieces and the assembly thereof then forcibly inserted, creating a force fit, into a shield which is formed as an annulus with an interior cylindrical surface engaging the exterior cylindrical surfaces of the magnet assembly. The force fit insures electrical continuity between the shield and the pole pieces. The shield extends into close proximity with the shaft being sealed and is provided with a relieved region immediately adjacent the interior cylindrical surface of the pole pieces to form a reservoir for receiving, trapping and retaining any ferromagnetic fluid which may escape from the gap between the pole pieces and the shaft. A mating shield is then assembled onto the previously assembled components after the introduction of the ferromagnetic fluid into the seal gaps. All elements of the seal assembly are adhesively sealed to adjacent elements to prevent the formation of gaps or capillaries which may act to attract and transport ferromagnetic fluid away from the seal gap between the pole pieces and the shaft. At least one of the shields is in reliable electrical contact with the hub into which the entire assembly is inserted.

5 Claims, 4 Drawing Sheets

MAGNETIC FLUID SEAL CONTAINMENT SHIELD

FIELD OF THE INVENTION

The invention relates to magnetic seals and, more specifically, to magnetic seals for sealing a clean environment where high speed relative rotation is required, and where the magnetic seals have shields to capture and contain the ferromagnetic seal fluid in the region of the seal.

BACKGROUND OF THE INVENTION

Disk drives for magnetic disk storage devices require an exceedingly high standard of cleanliness. The sealing of the disk drive chamber is essential to maintain the extremely high standard of cleanliness within the disk chamber.

Contaminants, which typically tend to migrate into the disk drive chamber, include dust particles and the residue and vapors from the spindle motor and bearings of the disk drive storage device. Further, the lubrication media, oils or greases, used in the bearings of the motor tends to give off aerosols or vaporous components of the lubricants; without an adequate seal, these aerosols and vapors would tend to migrate into the disk drive chamber.

To prevent the migration or these contaminants into the disk chamber of the disk drive storage device, it is essential that a reliable seal be placed between the motor chamber and the disk chamber. Magnetic seals have been widely used in this environment, wherein an annularly shaped magnetic arrangement is placed in an annular space around the shaft to be sealed and the gap between the pole pieces of the annular magnetic arrangement and the shaft are closed with a ferromagnetic fluid. Typically, the seal rotates about a fixed shaft. The fixed shaft is a portion of the motor which drives the disk drive hub. The magnetic storage disks typically are attached by conventional means to the hub and rotated therewith. However, the seal may be implemented in a rotating shaft drive design.

As the seal assembly rotates, the movement of the seal assembly and, particularly, the pole pieces around the shaft will cause movement of the ferromagnetic fluid through the viscous action of the fluid adhering to the pole piece and to the shaft and being revolved with the rotating part. With this movement of at least some of the ferromagnetic material around the shaft, centrifugal forces act to displace quantities of this fluid outwardly from the shaft and thus displace the fluid from the seal gap.

Once the fluid has been displaced from the seal gap, the magnetic influence of the magnetic seal structure on the ferromagnetic fluid is lost or at least overcome; the fluid is then free to respond to further forces and either to migrate into the motor cavity and potentially foul the motor bearing lubricant, or to move into the disk cavity or chamber and contaminate the magnetic storage disks and other internal components.

U.S. Pat. No. 4,701,653 to Merkle, et al; U.S. Pat. No. 4,779,165 to Elsaesser, et al; U.S. Pat. No. 4,817,964 to Black, Jr. and U.S. Pat. No. 4,907,897 to Shirotori all disclose magnetic seals for magnetic disk storage units but fail to disclose any shields associated with the magnetic seal which would assist in any way with the ferromagnetic fluid containment in the seal gap.

An attempt to prevent or suppress the migration of ferromagnetic seal fluid has been made in a magnetic seal design by Nidec Corporation, where a single shield was associated with a magnet and two magnetic pole pieces in an attempt to reduce magnetic fluid migration into the disk chamber of the magnetic storage disk device. The design of the prior art seal is illustrated in FIG. 1.

One of the shortcomings of the design shown in FIG. 1 is that the interface between the shield and the adjacent magnetic pole piece acts as a capillary which captures, holds and transports any magnetic fluid which is removed by centrifugal force from the seal gap into the capillary, and thus retains the ferromagnetic fluid in a region from which the ferromagnetic fluid may never be recovered to be repositioned in the seal gap.

Further, the prior art design of FIG. 1 lacks any ability to maintain any magnetic fluid displaced by centrifugal forces from the bottom pole of the seal. Accordingly, that displaced fluid inherently will be dispersed into the motor cavity of the device, lending the possibility that contamination of the motor assembly and subsequent malfunction of the motor or bearings can occur.

Additionally, the assembly integrity of the prior art design illustrated in FIG. 1 relies upon an adhesive seal between the bottom pole and the shield plus a second adhesive seal between the shield and the hub.

All the elements, including both top and bottom pole pieces, the magnet and the shield, have slip fits with respect to the surfaces within which they are positioned. With a slip fit, the magnet assembly must be sealed into the shield by some type of an adhesive seal material and the shield then must be attached to the hub by an adhesive seal material. Any defects in the adhesive seals of the pole pieces, shield and magnet may result in leakage of the magnetic fluid. Additionally, the prior art design of FIG. 1 has no seal of any material between the top pole and the top shield.

U.S. Pat. No. 5,009,436 to Endo, et al, and assigned to Nippon Denson Corp., illustrates a shield arrangement on one side of a magnetic seal using a magnetic shield to create a secondary control over the flux density near the pole pieces of the magnetic seal. This secondary magnetic flux path to the shaft may attract and hold ferromagnetic fluid in a secondary region which will, at the same time, deplete or reduce the sealing fluid supply at the primary seal gap. Magnetic repulsion is relied upon to prevent the fluid from escaping the seal.

SUMMARY OF THE INVENTION

The present invention has a significant aspect in that it captures the ferromagnetic seal fluid, which may be spun away from the magnetic seal gap, and holds that fluid within proximity of the magnetic field so that the fluid is available for reattraction into the seal gap.

Another significant aspect of the invention is that by designing the engagement of the magnet and pole pieces with one of the shielding member as an interference or force fit, the need for an adhesive seal between the parts to retain the parts in their assembled state and the possibility of complications resulting from a defective adhesive assembly seal are reduced, and overcome when the adhesive seal is used in addition to a press fit. The use of adhesive seals only to hold the assembly together defeats or at least limits electrical continuity between the pole pieces and the shielding pieces and between the shielding pieces and the hub. A force fit insures good electrical continuity between several elements of the design.

The present invention utilizes a magnet placed between two annularly shaped pole pieces which in turn surround a shaft. The two pole pieces are adhesively bonded to the annularly shaped magnet to form a single assembly; then the pole pieces are seated with a press fit or bonded within a cylindrical surface in a bottom shield member. The bottom shield member then is positioned with a force fit or bonded within the hub of the magnetic disk storage unit. The annular interface between the bottom shield and the bottom pole is sealed with an adhesive material, gasket, 0-ring or other seal approach to restrict the capillary flow of the ferromagnetic material into the gap between the bottom pole and the bottom shield. A top shield member is then adhesively sealed onto the bottom shield and the top pole to further contain the ferromagnetic fluid at the seal region to prevent its migration by capillary action radially outward from the shaft.

Accordingly, the ferromagnetic fluid is restricted to and contained in the region immediately adjacent to the seal gap between the pole pieces and the motor shaft, thereby assuring a reliable magnetic seal as well as preventing undesired migration of the ferromagnetic material into either the motor cavity or the disk cavity of the magnetic disk storage device.

The seal can also be over-filled, to a limited degree, with minimal risk of contaminating the areas on either side of the seal. Over-filling is preferable to under-filling as long as the excess fluid is contained and controlled, inasmuch as under-filling leads to early seal failure. The fluid containment characteristics of the present invention provide for longer seal life since fluid lost in prior art designs is captured, retained and available to replenish the seal gap region.

A clear understanding of the invention may be had by referring to the drawings and the description of the invention to follow.

Figure 1:
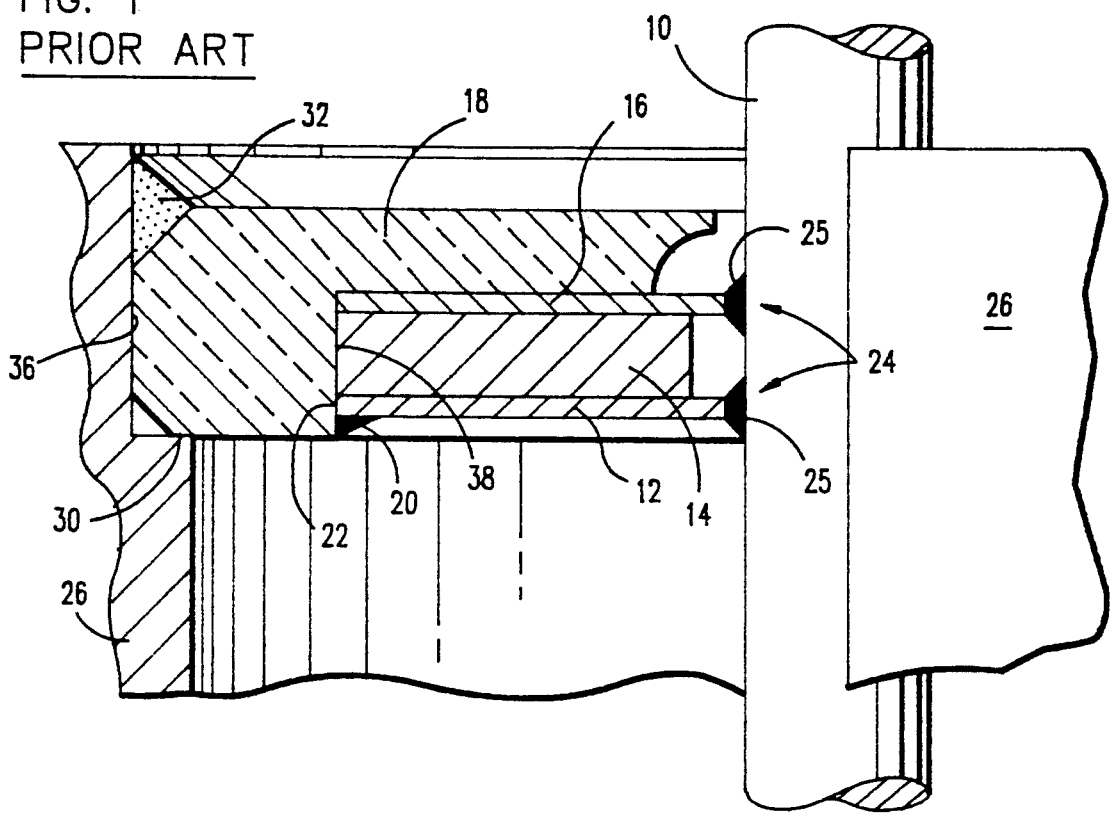
FIG. 1 is a cross-sectional depiction of a prior art magnetic seal assembly for a magnetic storage device.

DETAILED DESCRIPTION OF THE PREFERRED EMBODIMENT OF THE BEST MODE FOR CARRYING OUT THE INVENTION

A description of the structure of the prior art will be helpful in understanding the advantages and the structure of the present invention. Referring to the prior art drawing FIG. 1, a shaft 10 is surrounded by an annular assembly comprised of a bottom magnet pole 12, a magnet 14, a top magnet pole 16 and a shield 18. The bottom pole 12 and magnet 14 are positioned in facing relation to each other. Likewise, the magnet 14 is positioned in facing relation to the top pole 16.

This annular assembly is then inserted into the cylindrical cavity 38 in the shield 18. Shield 18 is annularly shaped to closely surround shaft 10. The magnet 14/pole 12, 16 assembly is loosely placed within the cylindrical cavity 38 in the shield 18 and attached to the shield 18 with an adhesive bead 20 deposited to engage the interior cylindrical surface 22 of shield 18 and the exposed surface of bottom pole 12. The shield 18 and magnet 14/pole 12, 16 assembly is then inserted into a cylindrical cavity 36 of a hub 26 and attached to the hub 26 with an adhesive material 32. Because the fit between shield 18 and hub 26 is a slip fit, retention of the assembly depends on the adhesive 32.

Upon assembly of the hub 26 and shield 18 to the shaft 10, the magnetic fluid 25 is then introduced into the region of the poles 12, 16 and the magnetic field generated by magnet 14 is then effective to attract the ferromagnetic seal fluid 25 into the gaps 24 between pole pieces 12, 16 and shaft 10.

Electrical continuity between shield 18 and the pole pieces 12, 16 relies upon incidental contact between the bottom pole 12 and shield 18 around its circumference and between top pole 16 and shield 18 around its circumference or its annular surface intermediate the pole 16 and shield 18. With a slip fit and adhesive retention of the magnet 14/pole 12/16 assembly, tolerance and eccentricity variations in the ferromagnetic fluid gap 24 increase from the optimum.

Electrical continuity between the hub 26 and the shield 18 is dependent upon surface contact between the shield 18 and the hub 26 on shoulder surface 30, and/or annular contact on surface 36.

Electrical continuity between shield 18 and shoulder 30 is unreliable since the adhesive bead 32 provides the only retaining force for the shield 18. The adhesive bead 32 may be of a material of sufficiently low viscosity as to be pulled, through capillary action, or gravity, into the gap, 37 between shield 18 and hub 26. Unless the shield 18 is forcibly engaged with shoulder 30 during the period of application and curing of the adhesive bead 32, there may be little if any electrical contact between the hub 26 and shield 18. Thus, it can be seen that any coincidental electrical contact between shield 18 and hub 26 at the cylindrical interfaces is, in all probability, destroyed or at least greatly reduced. Electrical continuity between the shield 18 and hub 26 or pole pieces 12, 16 is very desirable, because the rotational friction of the hub 26, shield 18 or pole pieces 12, 16, with air in the vicinity of the moving parts, may cause electrostatic charge build-up and subsequent discharge if not properly connected to the other parts to eliminate electrical potentials. Electrical continuity through the rotating assembly may be desirable for reasons other than electrostatic discharge, such as where the rotating member must be electrically biased.

Shield 18 is only attached to the composite structure of bottom pole 12, magnet 14 and top pole 16 by virtue of the adhesive 20; accordingly, while electrical contact may exist between top pole 16 and shield 18, it is incidental. Further, the gap between shield 18 and top pole 16 will act as a capillary and will tend to pull any magnetic fluid 25 which is displaced from the seal gap 24 into the narrow gap between top pole 16 and shield 18. Such attraction and retention of the ferromagnetic fluid 25 in the gap 24 will tend to deplete the ferromagnetic fluid loading at the seal region or gap 24 between top pole 16 and shaft 10 potentially reducing the ferromagnetic fluid quantity sufficiently to cause a premature seal failure.

The design of the shield arrangement in FIG. 1, further has a significant disadvantage in that the bottom pole 12, magnet 14 and top pole 16, previously having been assembled, are inserted into shield 18 forming a subassembly. The subassembly, just previously described, is then inserted into the hub 26 and the adhesive bead 32 is applied to hold the assembly into hub 26. When hub 26 and the subassembly comprising bottom pole 12, magnet 14, top pole 16 and shield 18 are then positioned surrounding shaft 10, it is necessary at that point of the assembly process to introduce sufficient ferromagnetic fluid 25 into the region surrounding the shaft 10 and intermediate the shaft 10 and poles 12, 16. In view of the very small gap between shield 18 and shaft 10 the introduction of the ferromagnetic fluid 25 is very difficult. This difficulty increases the cost of the assembly operation as well as reduces the reliability of the magnetic shaft seal inasmuch as inadequate ferromagnetic fluid quantities may be ultimately positioned in the gaps between poles 12, 16 and shaft 10.

With no seal between pole pieces 12, 16 and magnet 14 or between pole pieces 12, 16 and shield 18, the inherent gaps formed there between may act as capillaries and transport ferromagnetic fluid away from the seal region, depleting the seal and possibly leading to early failure of the seal, bearing, disk file, motor or other mechanism.

Figure 2:
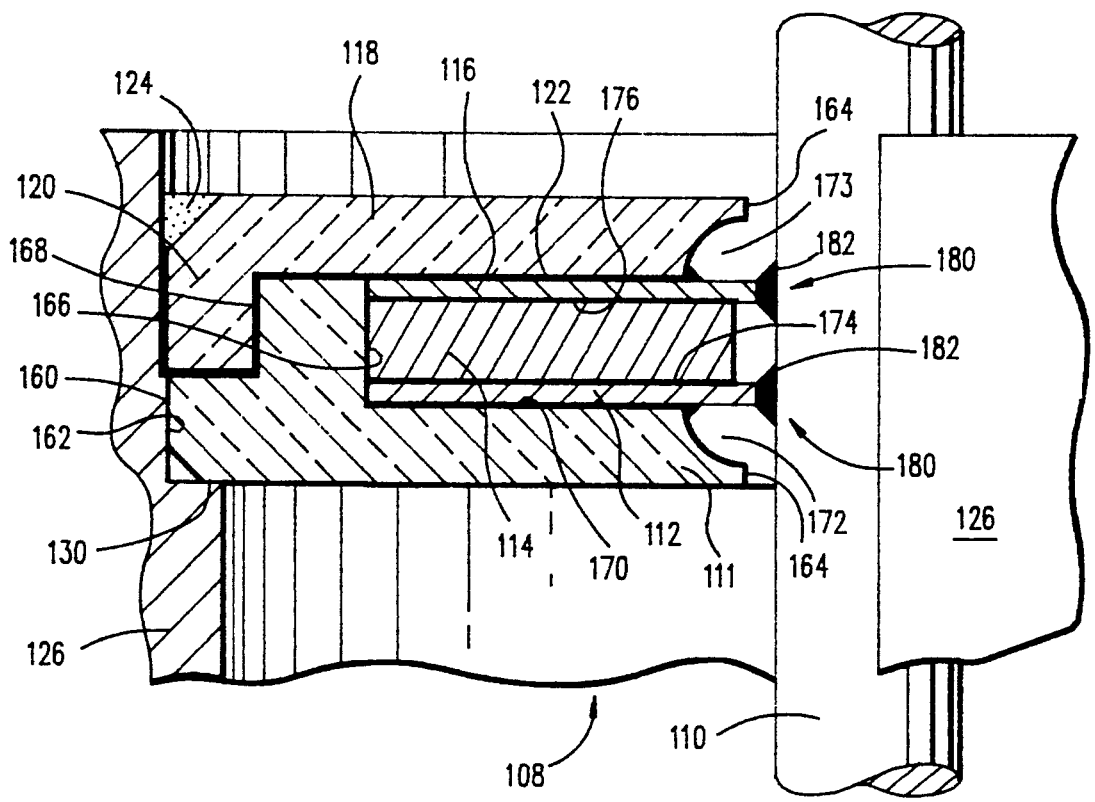
FIG. 2 is a cross-sectional depiction of the magnetic seal assembly of the present invention.

With this understanding of the prior art seal widely used at the present time, reference is now made to FIG. 2 illustrating the present invention. Shaft 110 is provided around which a magnetic disk pack assembly, not shown, will rotate. The disk pack assembly will be mounted on hub 126.

The magnetic seal formed between poles 116 and 112, and shaft 110, to contain the environment within the motor cavity 108 comprises a bottom shield 111. Bottom shield 111 is an annularly shaped piece of non-magnetic electrically conductive material such as aluminum, conductive plastic or a non-magnetic stainless steel. Plastics or other non-conducting and non-magnetic materials can be used, if satisfactory in other respects, in those environments where there is no concern about electrical conductivity.

Bottom shield 111 is provided with an outer cylindrical surface 160 which will abut an inner cylindrical surface 162 on the hub 126. In addition, bottom shield 111 is formed to have an inner cylindrical surface 164 closely proximate the circumference of shaft 110. Bottom shield 111 additionally is formed to have an intermediate cylindrical interior surface 166 and an intermediate exterior cylindrical surface 168. The intermediate cylindrical surface 166, in conjunction with the planar surface 170, forms a recess into which the magnet pole assembly 112, 114, 116 will be placed.

Bottom shield 111 is advantageously provided an annular relief 172 which forms an annular reservoir when bottom pole 112 is positioned into the relief formed by surface 170 and intermediate interior cylindrical surface 166. This region 172, together with its corresponding counterpart 173 to be described later, acts as reservoirs to trap and retain the ferromagnetic fluid 182 used in the seal formed by elements 112, 114, 116 and 118.

Bottom pole 112 is a magnetically permeable plate in annular form. The interior radius of the annular bottom pole 112 is slightly larger than the radius of the shaft 110. The outer radius of the bottom pole annulus 112 is slightly larger than the radius of the interior cylindrical surface 166 in order to create an interference or force fit between pole 112 and bottom shield 111.

Magnet 114 is annularly shaped and likewise will surround shaft 110 when positioned in the assembly.

Magnet 114 is adhesively bonded on one of its mating planar, annular surfaces to bottom pole 112 at their interface 174. The interface 170 between bottom shield 111 and bottom pole 112 is likewise adhesively or mechanically sealed to prevent any gap or capillary from being formed.

Magnet 114 is adhesively bonded at interface 176 to top pole 116. Top pole 116 is an annulus formed identically to bottom pole 112 of identical material and having identical dimensional relationships to the interior intermediate cylindrical surface 166. This adhesive bonding assures close proximity between bottom pole 112, magnet 114 and top pole 116 as well as prevents the formation of capillaries or gaps between adjacent elements. Also, the periphery of pole pieces 112 or 116 may be bonded adhesively to the shield in lieu of the press fit if electrical continuity is not necessary.

The assembly of the bottom pole 112, magnet 114 and top pole 116 is forcibly inserted into engagement with and seated on the cylindrical surface 166.

The force or interference fit between poles 112, 116 and bottom shield 111 insures electrical continuity at the pole/shield interface on cylindrical intermediate surface 166, completely surrounding the poles 112, 116.

The fabrication of the subassembly comprising bottom shield 111, bottom pole 112, magnet 114 and top pole 116 may be accomplished separately, and the subassembly then inserted into the hub and forcibly engaged with the interior cylindrical surface 162 of hub 126. At this point, ferromagnetic fluid 182 may be injected into the gaps 180 formed between bottom pole 112, top pole 116 and shaft 110.

The insertion of the ferromagnetic fluid 182 into gaps 180 is greatly simplified as there is no shield in place adjacent top pole 116 to interfere with the insertion of the ferromagnetic fluid 182. Top shield 118, preferably fabricated from the same materials as bottom shield 111, is fabricated to conform to an annular shape meeting the same general requirements as bottom shield 111 with regard to the inner cylindrical surface 164 and relief region 173. Top shield 118 is provided with a flange 120 which mates with the open annulus formed by the intermediate exterior cylindrical surface 168 and the interior cylindrical surface 162 of hub 126. The fit between flange 120 and hub 126 is a slip or non-interference fit permitting the easy insertion of flange 120 into close relationship with bottom shield 111 while positioning top shield 118 in close proximity to top pole 116 thereby forming interface 122. Interface 122 is preferably sealed with an adhesive bonding material to permanently attach top shield 118 to top pole 116 and to seal the interface, thereby preventing the formation of a capillary or gap which would attract or receive and retain the ferromagnetic fluid 182.

To complete the magnetic seal assembly, an adhesive seal 121 is then formed between the surfaces of bottom shield 111 and flange 120 as well as the surface intermediate flange 120 and hub 126. An adhesive seal bead 124 may further be positioned intermediate top shield 118 and hub 126 in a region exposed to the disk cavity 125. The multiple surface bonding at 168 and all surfaces where bottom shield 111 and top shield 118 meet insures an adequate deterrent to fluid leakage.

The material choices for hub 126 include aluminum, stainless steel or plated malleable steel, with the requirement being that the hub 126 be electrically conductive in order to bleed off static electrical charges through the electrical contacts between hub 126 and bottom shield 111 and top poles 112, 116, respectively. Ferromagnetic fluid 182 is relatively electrically conductive with respect to other paths through bearings or other supports, and will complete the grounding circuit to shaft 110 which may then be frame grounded or grounded in any other preferred or desired manner.

Adhesive material to seal interfaces 170, 174, 176 and 122 acts to prevent capillary or gap/opening transportation or migration of any ferromagnetic fluid 182, which may be removed by centrifugal force from gaps 180 and forcibly projected outward from shaft 110 into reservoirs 172 and 173.

With no capillary or gap/opening exit path from the annular reservoirs 172 and 173, the ferromagnetic fluid 182 remains in the reservoirs 172, 173 and available for re-attraction by the magnetic flux paths between poles 112, 116 and shaft 110, thereby prolonging seal life.

Accordingly, the ferromagnetic fluid 182 at gaps 180 may be depleted for a short period of time; but upon the stopping of the rotation of hub 126 and the associated magnetic seal parts 111, 112, 114, 116, 118, the magnetic flux near gaps 180 will re-attract magnetic fluid 182 into gaps 180 to replenish the ferromagnetic seal if the ferromagnetic fluid 182 is captured and retained in reservoirs 172 and 173.

Figure 5:
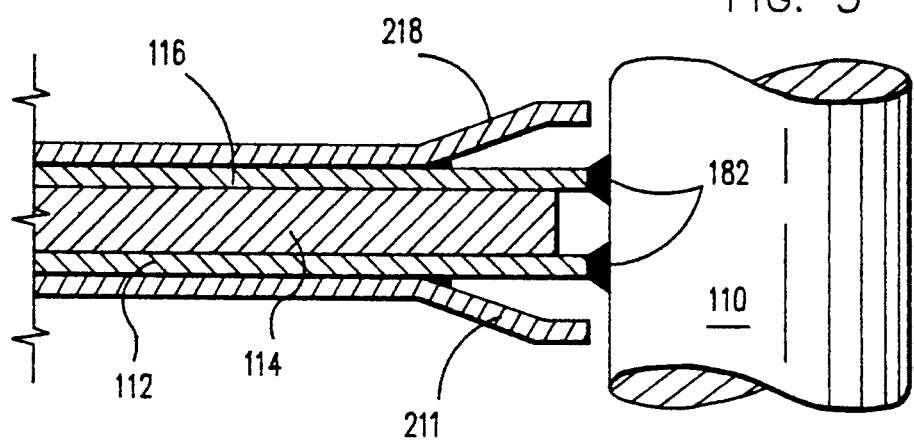
FIG. 5 is cross-sectional depiction of a seal assembly similar to FIG. 3 except that the shields are of a stamped type where the non-magnetic material is formed by stamping rather than other techniques.

Referring to FIG. 5, a seal of the same type as that in FIG. 2 is illustrated except that the top and bottom shield 118, 111 are replaced with shields 218, 211. Shields 218, 211 are of a non-magnetic metal such as aluminum and are formed by stamping. In other respects, the sealing of the shields 218, 211 to poles 112, 116 is the same.

Figure 6:
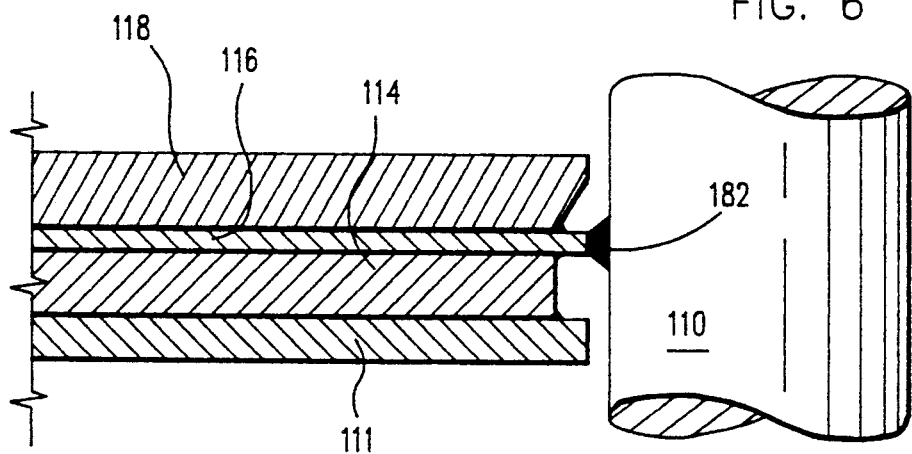
FIG. 6 is a cross-sectional depiction of a single pole piece seal arrangement.

In FIG. 6, an interior diameter seal with a single pole piece is illustrated. The pole piece 116 and magnet 114 are sandwiched between the two shield pieces 111, 118; all are sealed adhesively to eliminate capillaries.

Figure 7:
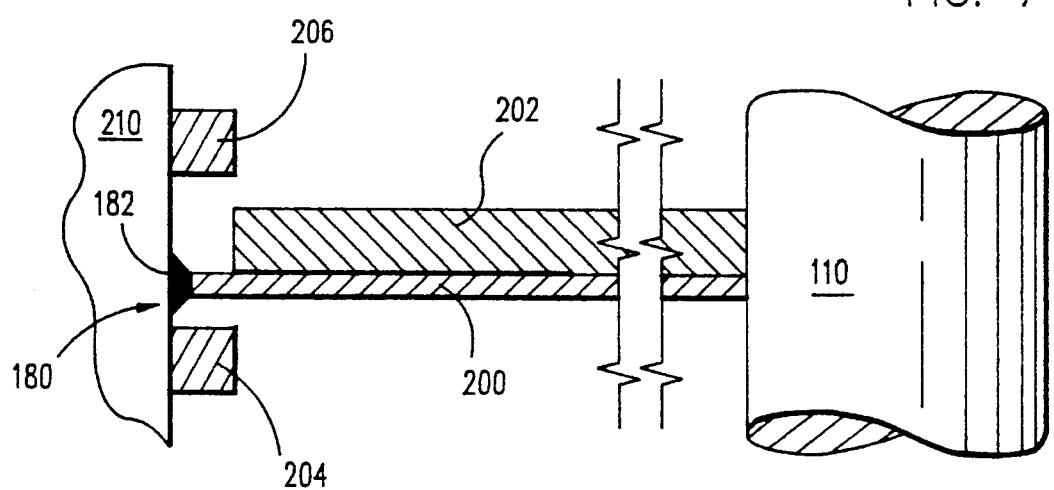
FIG. 7 is a cross-sectional depiction of a single pole piece seal arrangement where the seal is at the outside diameter surface of the pole piece.
Figure 8:
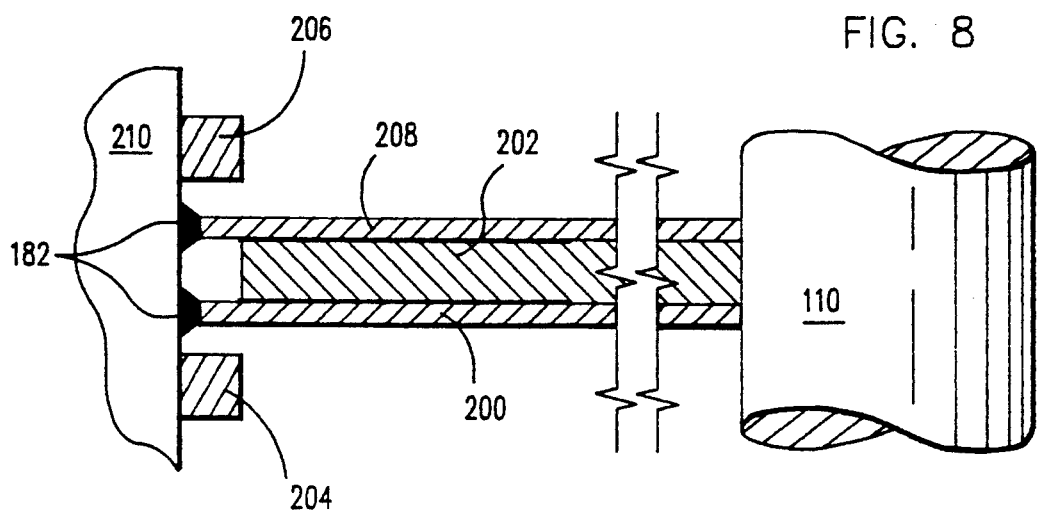
FIG. 8 is a cross-sectional depiction of a double pole piece seal arrangement where the seal is at the outside diameter surface of the pole piece.

The magnetic seal disclosed may also be embodied in an outer diameter seal as shown in FIGS. 7, 8. In FIG. 7, a magnet 202 is bonded adhesively to pole 200 to eliminate the capillary action of fluid depletion. Shields 204 and 206 will act to retain any ferromagnetic fluid 182 displaced from the gap 180.

The fluid 182 will be retained for re-attraction into the gap 180.

In FIG. 8, the seal is the same as the seal of FIG. 7 except that a stronger magnetic field is formed by using a second pole piece 208. The second pole piece creates a more efficient flux path than the return path in FIG. 7. In any event, the pole pieces and magnet are adhesively sealed on adjoining faces to seal capillary gaps.

The attachment of the pole piece 200 in FIG. 7 or pole piece 200, 208 of FIG. 8 to the shaft 100 may be by press fit, adhesive or other conventional approach.

Figure 9:
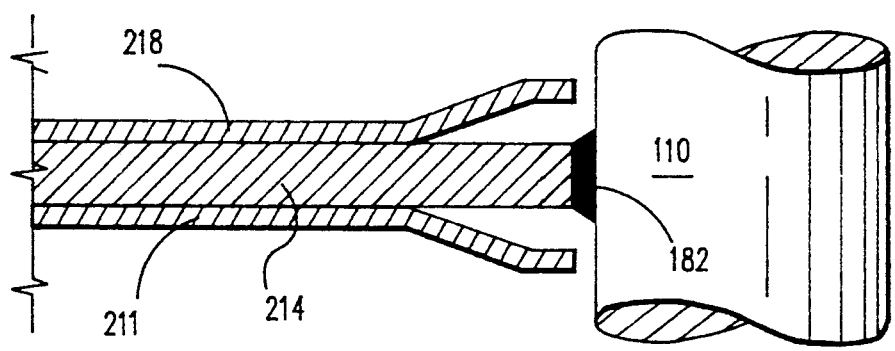
FIG. 9 is a depiction of a magnetic seal utilizing a magnet and two shields for an interior shaft seal.
Figure 10:
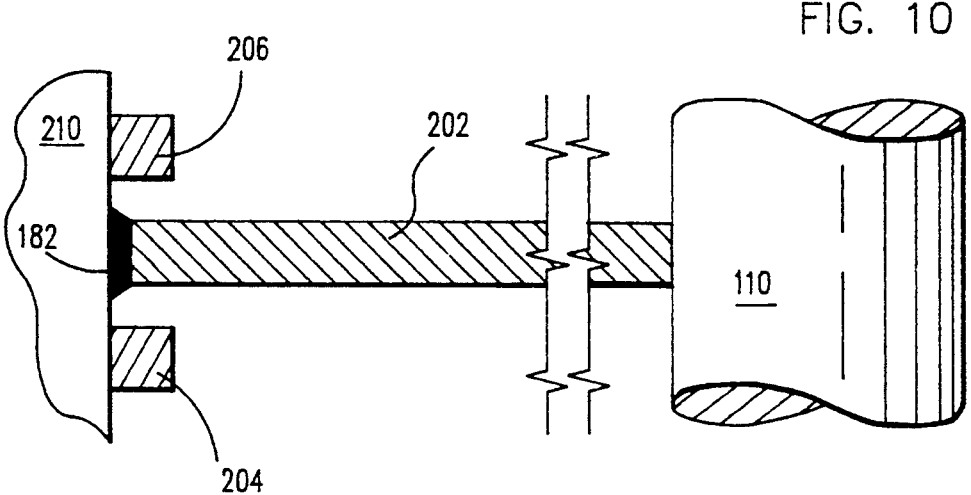
FIG. 10 is a depiction of an exterior magnetic seal utilizing a magnet on a shaft and two shields mounted on a hub surrounding the shaft.

FIGS. 9 and 10 show seals corresponding to FIGS. 5 and 8, respectively, except that the pole pieces are removed and flux flow is directly from the magnets 214 and 202, respectively, to the shaft in FIG. 9 and hub 210 in FIG. 10.

As one can see from the foregoing, as long as the magnetic fluid 182 seals gaps 180 and the adhesive seals between the various portions of the assembly and particularly between bottom shield 111 and flange 120 and between flange 120 and hub 126 remain undisturbed, no passages exist between the motor cavity 108 and the disk cavity 125 through which any contaminants, particles, lubrication aerosols or any part of the ferromagnetic fluid 182 may be transported. Centrifugal forces attempting to spin the ferromagnetic fluid 182 out of gap 180 are the only forces of significance acting on the magnetic fluid 182. Any displaced fluid will be trapped in annular reservoirs 172 and 173. The magnetic attraction of the flux field between poles 112 and 116 and shaft 110 will tend to re-attract the ferromagnetic fluid to the gaps 180. Accordingly, the ferromagnetic fluid 182 will be contained either in the gap 180 or in reservoirs 172, 73 and available for replenishing the ferromagnetic fluid 182 in gaps 180.

Figure 3:
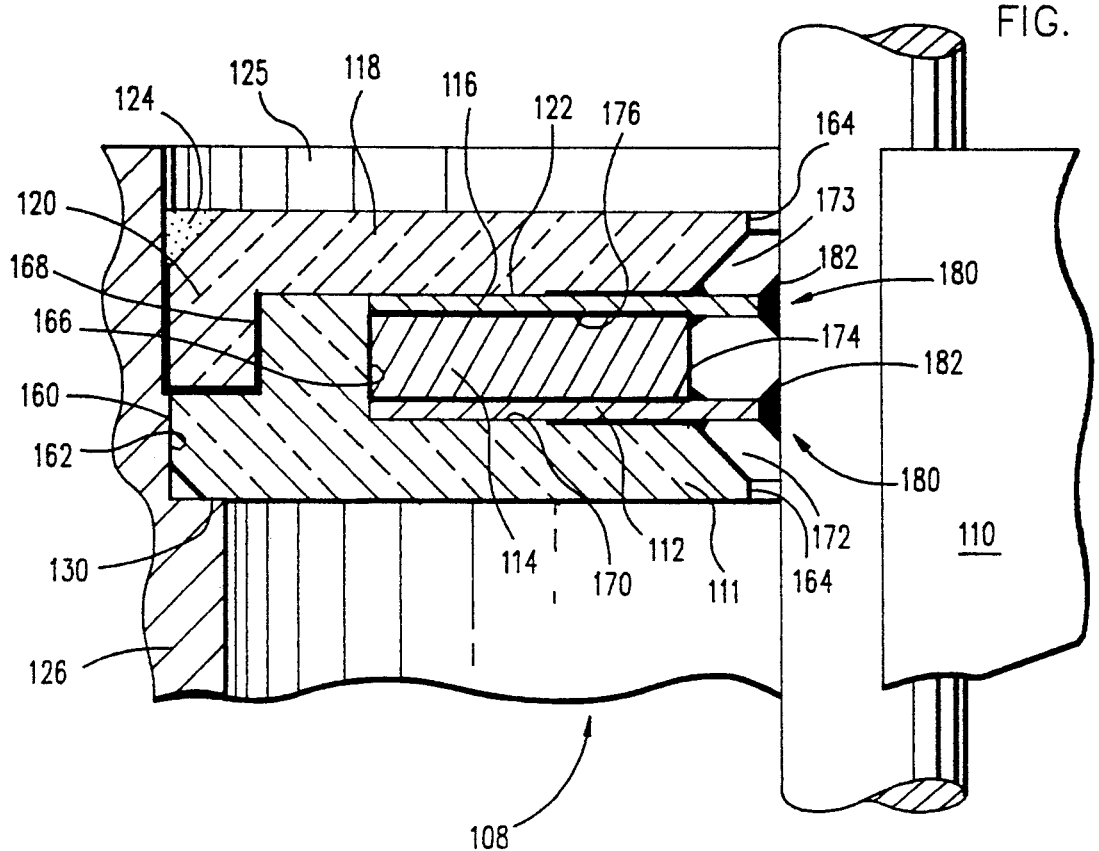
FIG. 3 is a cross-sectional depiction of the magnetic seal assembly with a ferromagnetic fluid-trapping cavity having a triangular cross-section.

It should be understood that various materials may be selected and various shapings may occur which would still remain within the scope of the invention. For example, the surface defining reservoirs 172 and 173, rather than being a concave surface such as illustrated in FIG. 2, may advantageously be substantial chamfers formed on the appropriate corners of the shields 111, 118 to form annular reservoirs having a substantially triangular cross-section as shown in FIG. 3, rather than the quarter circle cross-section as illustrated in FIG. 2. The shields may be of aluminum or non-magnetic stainless steel. The motor shaft must be magnetically permeable and electrically conductive.

Figure 4:
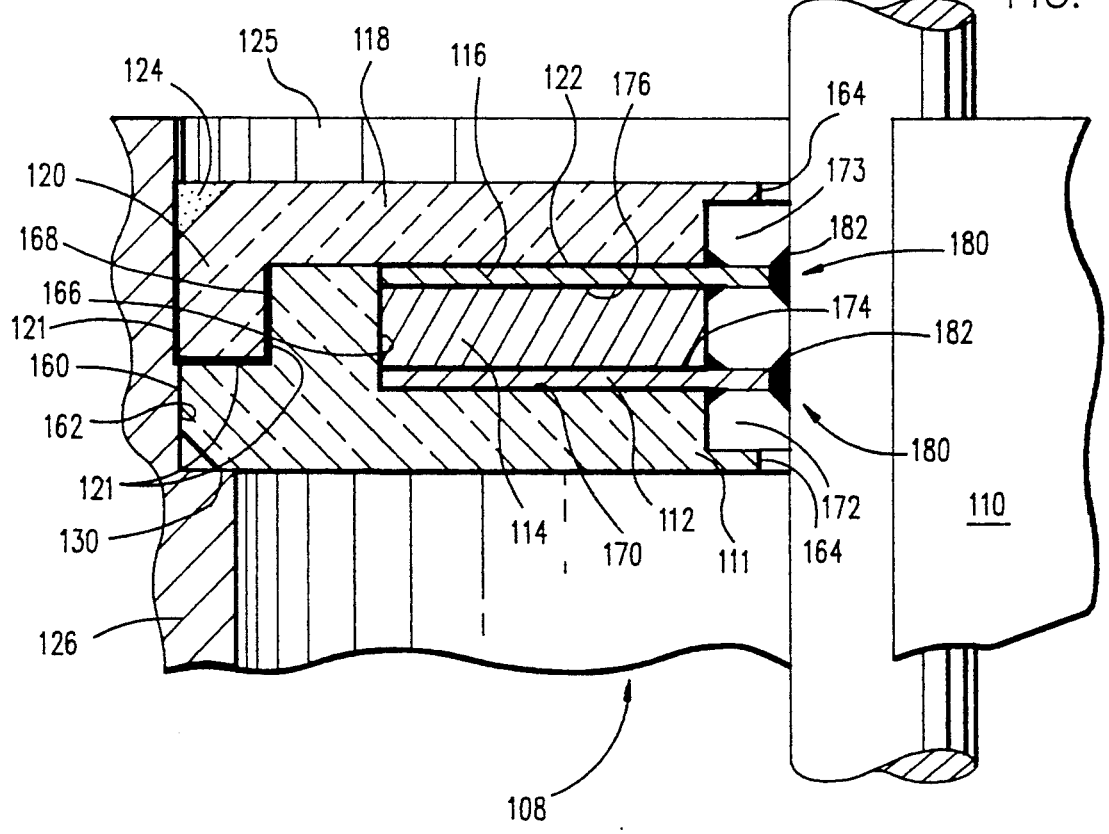
FIG. 4 is a cross-sectional depiction of the magnetic seal assembly with a ferromagnetic fluid-trapping cavity having an annular cylindrical shape.

Similarly, the reservoirs 172, 173 may be formed in an annular cylindrical form if desired, as shown in FIG. 4.

Magnet 114 is preferably be made of a barium ferrite material while the adhesive seals may be accomplished with readily available two-part epoxy compounds having a substantially long set-up time, such as Scotch-Weld 1838 Green by 3M Corporation. Silicone based adhesives such as GE Silicone RTVs available from General Electric Corporation may be used where the environment is not critical as to chemical compatibility.

Examples of magnetic fluids usable in this invention can be secured from Ferrofluidics Corporation under designation CFF100A or Omni Quest Corporation under product designation CMF4600.

It can be appreciated from the foregoing description and reference to the drawings that the present invention overcomes the shortcomings and disadvantages of the prior art that either only has one shield which is not adhesively attached at the pole shield interface or that has no shields and which will permit the contamination of either the motor cavity or the disk cavity with ferromagnetic material, which is centrifugally propelled away from the seal gap between the magnetic pole pieces and the shaft which the magnetic pole pieces surround.

Changes and modifications to the seals, shields and assembly may be made without departing from the scope of the invention as set forth in the following claims.

We claim:

1. A magnetic seal for sealing by separating a first cavity from a second cavity where a shaft extends from said first cavity into said second cavity and said seal and means for defining at least one of said cavities rotates relative to said shaft, comprising:

a shaft, having a radius, comprised of a magnetically permeable material;

a hub surrounding said shaft, rotatable relative to said shaft and comprising at least a cylindrical interior surface;

a first annular shield of non-magnetic material having a first interior cylindrical surface with a radius larger than said shaft radius by an amount to form a clearance gap between said shield and said shaft, an outer cylindrical surface of a diameter to fit with said hub cylindrical interior surface and an intermediate interior cylindrical surface;

said annular shield further comprising a surface relieved from said first interior cylindrical surface to a larger interior radius than said first cylindrical surface radius;

at least a pair of magnetically permeable annular poles having interior radii greater than said shaft radius to form magnetic gaps and an exterior radii proportional to fit within said intermediate interior cylindrical surface;

an annular shaped magnet fixedly attached to and intermediate said poles;

said magnet and said poles sealed to prevent the presence of a passage therebetween;

said one of said poles sealed to said first shield to prevent presence of a passage therebetween;

an annularly shaped second shield of non-magnetic material comprising at least an interior cylindrical surface having a radius larger than said radius of said shaft to form a gap between said shield and said shaft, and an exterior cylindrical surface having a radius smaller than said hub interior cylindrical surface radius to form a slip fit and a gap therebetween;

said second shield further comprising a surface relieved from said first cylindrical surface to a larger interior radius than said first cylindrical surface radius;

said second shield further sealed to said other of said poles to prevent presence of a passage there between;

a ferromagnetic fluid magnetically held between said poles and said shaft;

said first shield further comprising an intermediate exterior cylindrical surface and said second shield comprising an intermediate interior cylindrical surface complimentary to said intermediate exterior cylindrical surface of said first shield;

said second shield adhesively attached to said hub, whereby said relieved surfaces form with said poles annular retaining regions to trap and retain any said ferromagnetic fluid displaced from said magnetic gaps.

2. The magnetic seal of claim 1 wherein said adhesive attachment of said second shield comprises adhesive within said gap.

3. The magnetic seal of claim 1 wherein said first and second shields are sealingly attached to each other shield at least at said intermediate cylindrical exterior surface of said first shield and said intermediate cylindrical interior surface of said second shield.

4. A magnetic shaft seal comprising:

a pair of magnetic pole pieces each in annular shape having a periphery;

a magnet intermediate said pole pieces;

a pair of shield pieces of non-magnetic material annular in shape having a periphery and sides disposed in sealing contact with said pole pieces;

said shield pieces formed and disposed to define an annular containment region between said shield pieces and said pole pieces;

said pole pieces and said shield pieces disposed around a shaft and rotatable relative to said shaft and ferromagnetic fluid magnetically retained intermediate said pole pieces and said shaft;

said shield pieces comprised of electrically conductive material having a non-magnetic quality;

a hub encircling said shaft;

said pole pieces forcibly radially engaged around said periphery within at least one of said shield pieces, and at least one of said shield pieces forcibly engaged with said hub, thereby establishing electrical continuity between said pole piece and said hub through at least one of said shield pieces.

5. The magnetic seal of claim 4 wherein each said pole piece is adhesively sealed to said magnet and to a said shield piece.

* * * * *